May 26, 1964 G. A. DAILY 3,134,479

LOADER

Filed Feb. 5, 1962 4 Sheets-Sheet 1

INVENTOR:
GLENN A. DAILY
BY Joseph Januszkiewicz
ATTORNEY

LOADER
Filed Feb. 5, 1962 4 Sheets-Sheet 2
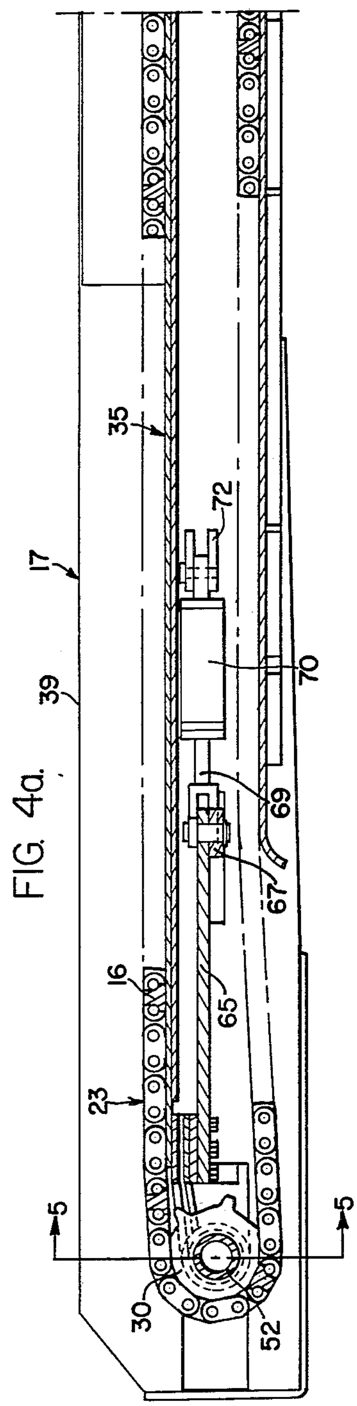
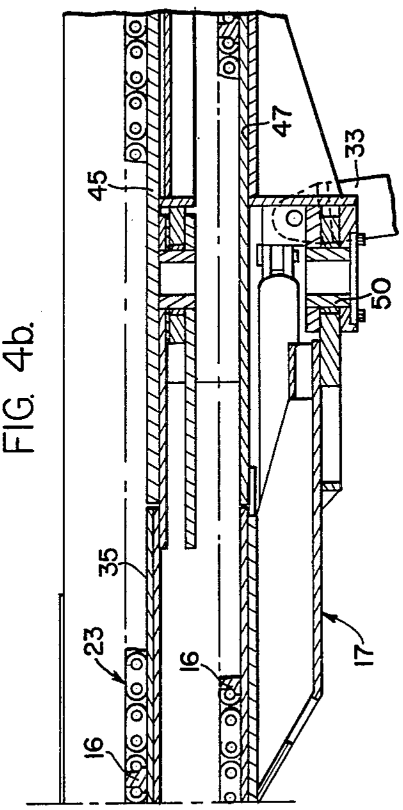
INVENTOR:
GLENN A. DAILY
BY Joseph Januszkiewicz
ATTORNEY

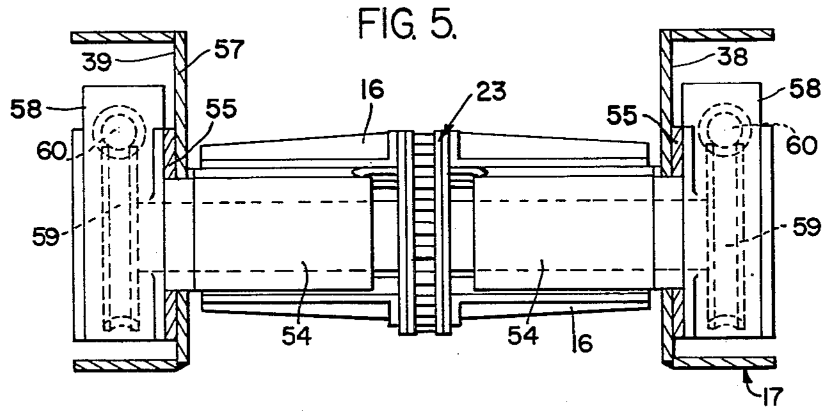
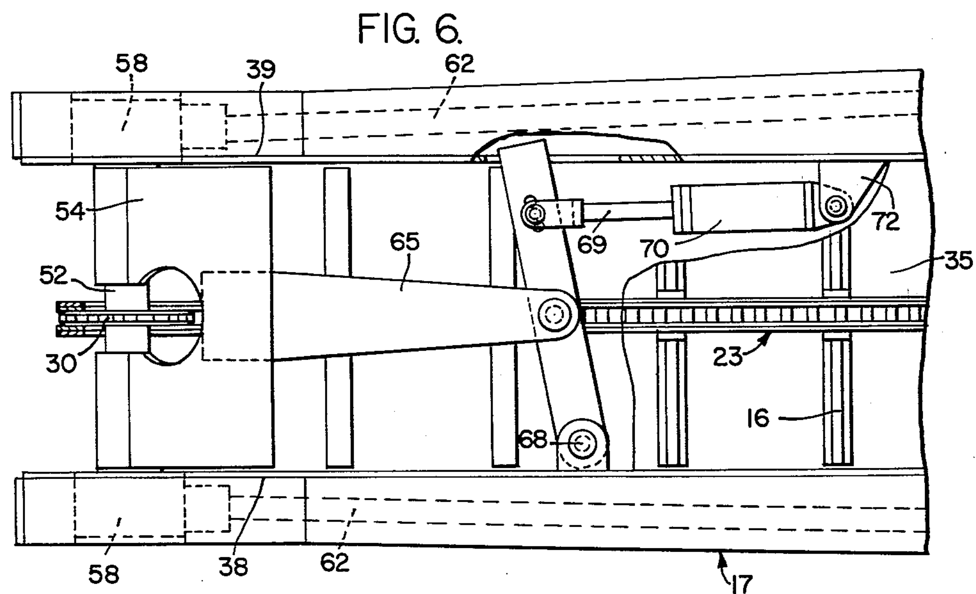
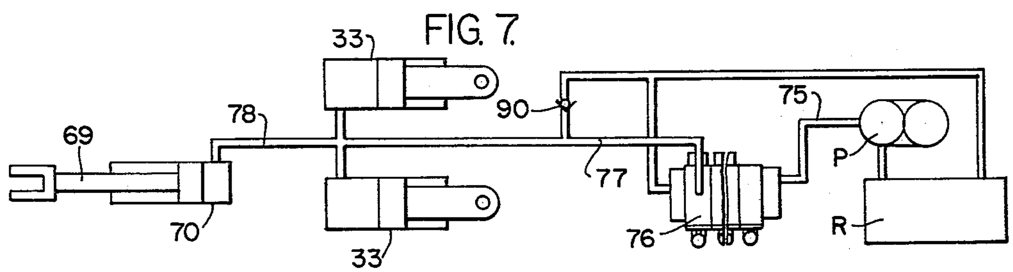
INVENTOR:
GLENN A. DAILY
BY Joseph Januszkiewicz
ATTORNEY LOADER
Filed Feb. 5, 1962 4 Sheets-Sheet 4
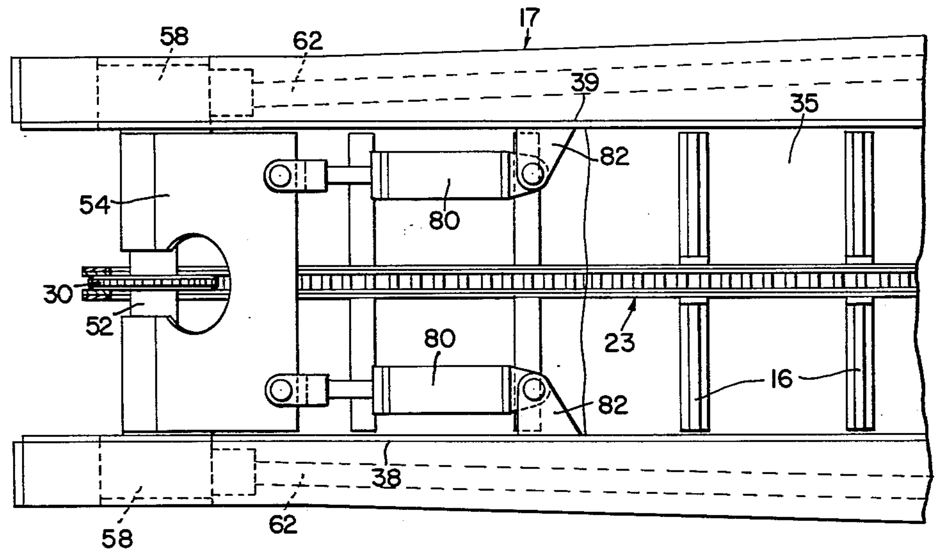
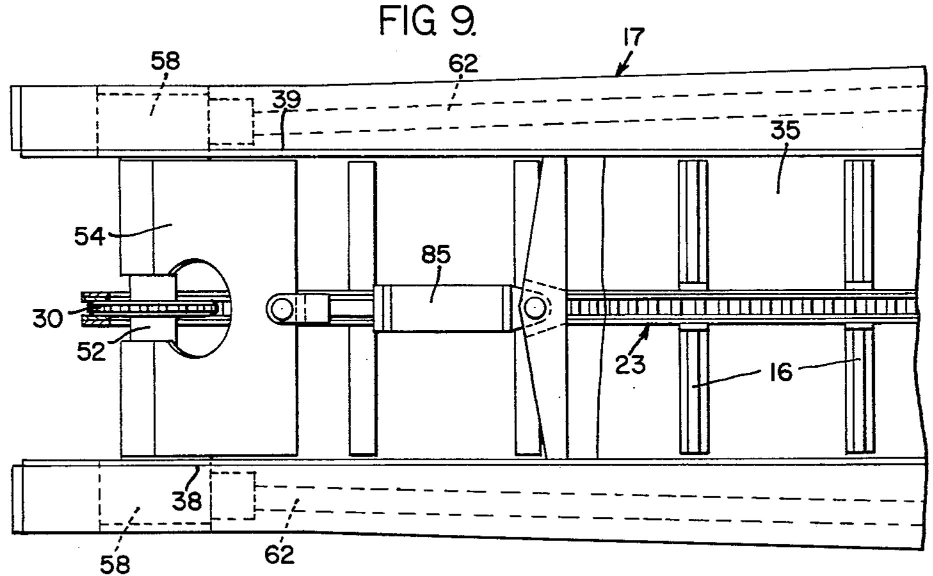
INVENTOR:
GLENN A. DAILY
BY Joseph Januszkiewicz
ATTORNEY United States Patent Office 3,134,479

Patented May 26, 1964

3,134,479

LOADER

Glenn A. Daily, Utica, Pa., assignor to Joy Manufacturing Company, Pittsburgh, Pa., a corporation of Pennsylvania Filed Feb. 5, 1962, Ser. No. 171,081

4 Claims. (Cl. 198—109)

This invention relates to a material loading apparatus and more particularly to the material conveying portion of the loading apparatus of the articulated type in which there are relatively laterally swingable portions and a central chain equipped with flights for the conveyance of materials.

Loading machines of the type mentioned commonly include material gathering devices, mounted on the forward portion of the loading machine which brings the material to be loaded into the field of operation of an elevating conveyor portion or section which material is then conveyed rearwardly along the longitudinal central portion of the conveyor to a rear discharge conveyor section which discharge section is also an elevating conveyor portion which is ordinarily connected by an appropriate pivot mechanism for lateral swinging, so as to permit the delivery of material to a desired point. It is common to employ a single chain and flight conveyor extending from the front end of the gathering section to the rear of the delivery section, the whole flight conveyor being a single unit for the machine.

The centrally disposed conveyor is centered with respect to the conveyor at the forward and rearward ends of the latter by engagement with sprockets or idlers, and has its flights cooperate with the side walls of the conveyor trough as relative swinging between portions of the latter take place, to guide the conveyor chain along the conveyor trough. With such conveyors, if the sprockets or idlers rotate on fixed axes with respect to the trough sections which support them, and angularity is introduced between longitudinal different portions of the conveyor by relative lateral swinging, there are produced conditions which result in slack in the chain. The orbital length of the chain is predetermined by its construction, but the linear length of its orbit is measured between the sprockets or rollers at its ends so that upon lateral swinging of one portion of the conveyor relative to another, the linear length of the orbits is changed. This is due to the fact that as the lateral swinging portion is moved towards its lateral position and the chain is permitted to cut the corner about which the swingable portion of the conveyor pivots. Therefore, in the absence of provision to prevent slack, such slack would exist in the chain when the laterally swingable portion of the conveyor is at one side or the other of the longitudinal center line of the loading machine, and if the chain was made of a length which would be correct when the conveyor has the swinging thereof swung to one of its extreme lateral positions, the conveyor would not have its parts brought to mutually aligned positions because there would not be enough overall length in the chain to permit this. With materials such as coal, it is possible to provide an adjustable mounting for one of the end idlers of the conveyor and to employ springs wherein the strength and compression of the springs would be sufficient to maintain the requisite tension in the chain during the lateral swinging movement of the tail section of the conveyor. However, in handling of hard rock or heavy ores, it is possible that the load upon the conveyor may be so great that the springs, if made strong enough to maintain the necessary tension on the chain, would place an excessive load on the bearings and would result in undesirable wear and excessive consumption of power during the driving of the flight conveyor. The use of springs is undesirable in that their strength changes with use, resulting in an unpredictable wear problem.

It is accordingly one object of this invention to provide a new and improved arrangement for keeping undesirous slack out of a flight conveyor chain.

It is a further object of this invention to provide an improved conveyor chain for a loading machine.

It is a further object of this invention to provide an improved articulated conveyor of the chain and flight type.

It is still a further object of this invention to provide an improved articulated conveyor of the chain and flight type having driving and idler elements at the opposite ends of the chain loop, and having improved means for adjusting the position of the element at the delivery end of the conveyor for the purpose and to the extent required to prevent undue slack in the conveyor chain.

It is a further object of this invention to provide an improved means for precluding the existence of undesirable slack during the lateral swinging of a portion of an articulated conveyor in either direction out of a straight line relationship.

Another object of this invention is to provide an improved flight type conveyor of articulated construction, having improved means for driving the conveyor chain and improved means for maintaining proper chain tension in all of the various positions of the articulation of the conveyor.

These and other objects of the invention will become more apparent upon consideration of the following detailed description of a preferred embodiment thereof, when taken in conjunction with the following drawings, in which.

Figure 1:
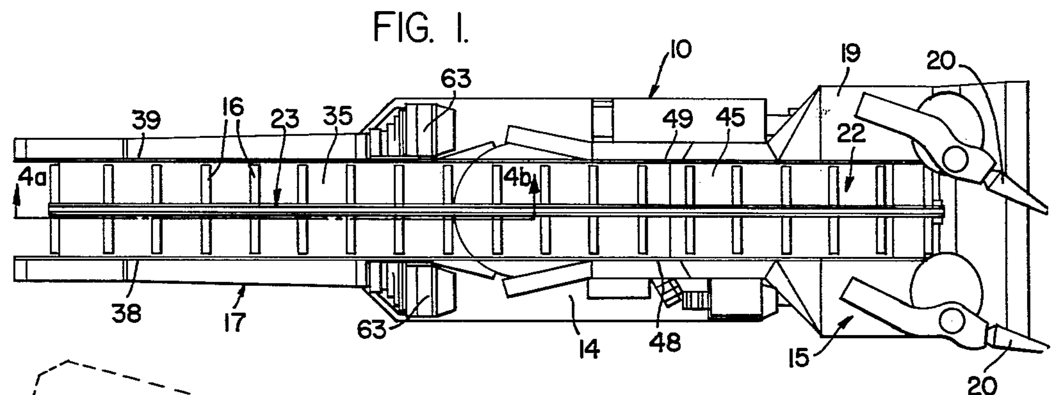
FIG. 1 is a top plan view of a loading machine made in accordance with my invention.
Figure 3:
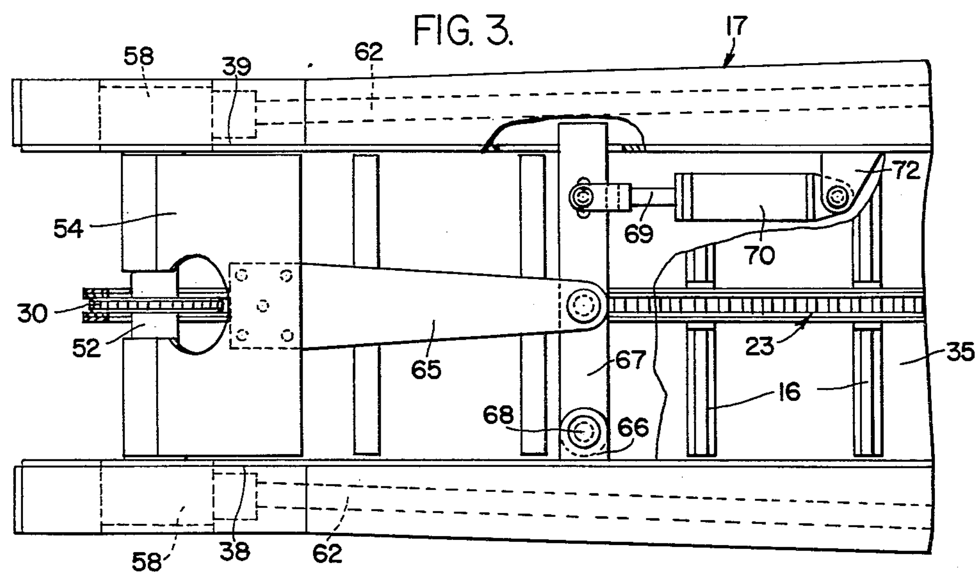
FIG. 3 is an enlarged fragmentary plan view of the rearward portion of the conveyor section with parts removed to show the take-up mechanism.

FIGS. 4A and 4B taken together, constitute a cross-sectional view, taken on lines 4—4 of FIG. 1 showing a cross sectional view of the rearward portion of the conveyor;

FIG. 5 is an enlarged vertical transverse section on the plane of the section line 5—5 of FIG. 4A showing the construction of the movable drive sprocket at their rearward end of the flight conveyor;

FIG. 6 is a top plan veiw of the rearward portion of the conveyor with portions of the structure removed to show the hydraulic take-up on the conveyor similar to FIG. 3 however, showing the take-up mechanism in a different position;

FIG. 7 is a schematic view of the hydraulic circuit for the loading machine showing the hydraulic take-up jacks and the elevating jacks thereof;

FIG. 8 is a top plan view of the rearward portion of the conveyor with portions of the structure removed to show a modified form of the hydraulic take-up mechanism for the loader;

FIG. 9 is a top plan view of the rearward portion of the conveyor with portions of the structure removed disclosing a further modification of the hydraulic take-up mechanism for the loader.

Referring now to the drawings it may be noted that the invention is there shown incorporated in a loading machine which is generally designated 10 having a tractor supported main frame or body 14 mounted on a mobile base 11, with a forward gathering section generally designated 15 supported on the main frame 14 and an elevating and discharge conveyor generally designated 17. The forward gathering section 15 comprises an inclined upper plate 19 over the surface of which gathering elements 20, 20 are adapted to be moved in such a manner that their points trace orbits of such a nature as to move the material to be handled by the loading machine into the zone of operation of a conveyor mechanism 22. The structure of a gathering mechanism does not enter, in any material way, into the present invention.

The conveyor of a single chain type with oppositely extending flights constitutes in effect a discharge conveyor for delivering the material collected by the gathering mechanism. The chain is indicated at 23 and carries flight elements 16 extending in opposite directions from the opposite sides of the chain. The chain 23 and flights 16 have associated with them trough sections to maintain the coal in a longitudinal direction as it is conveyed rearwardly from the forward portion of the machine.

The conveyor includes a forward, and a rearwardly extending material portion 17 which rearward material delivery portion 17 of the conveyor is laterally swingable as well as being capable of being elevated relative to the tractor mounting. The rearward portion 17 can be elevated so that the height of the discharge and the space beneath the rearward end portion of the material delivery portion of the conveyor may be changed as desired.

The forward gathering portion 15 of the loader has an idler sprocket (not shown) about which the chain 23 is guided such that the idler sprocket changes the direction of motion of the chain as it comes from the rearward portion underneath the conveyor section thence around the idler sprocket thence rearwardly along the upper portion of the loading machine in a manner well known and understood in the art. The rearward portion of the elevating and discharge conveyor 17 supports a movable driven sprocket 30 to be described about which the chain 23 is guided to change the direction of motion of the conveyor mechanism 22.

Figure 2:
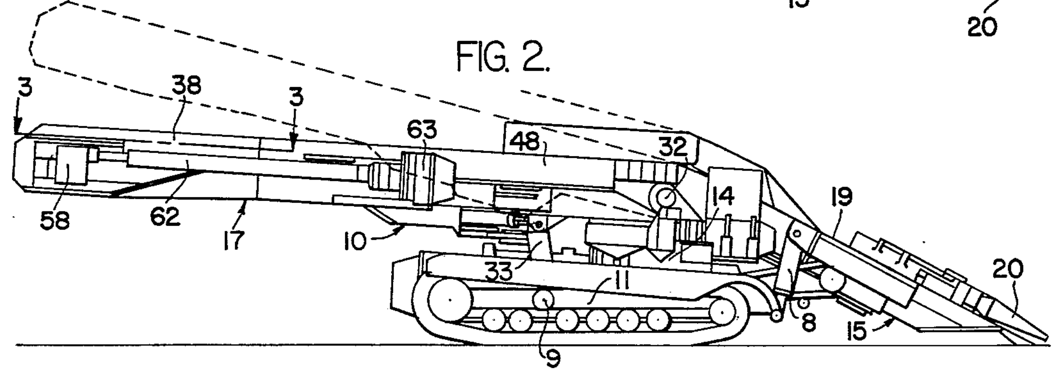
FIG. 2 is a side elevational view of my improved loader.

The elevating and discharge conveyor 17 is pivotally mounted with respect to the tractor support main frame 14 by a pivotal connection 32 (FIG. 2) wherein the elevating and discharge conveyor 17 is adapted to be swung about pivot means 32 through a hydraulic elevating jack 33 suitably pivotably mounted to the respective underside portion of elevating and discharge conveyor 17 and having the cylinder end suitably connected to the upper portion of the tractor main frame 14.

The chain 23 and flights 16 having associated with them trough sections, namely a forward trough section 45 and a rear delivery trough section 35. The forward trough section 45 has side members 48 and 49 to define a trough therebetween. The rearward trough section 35 is suitably pivotally connected to the adjacent forward trough section 45 about a pivotal connection 50 as shown in FIG. 4B such that the forward trough section 45 permits lateral swinging adjustment of the rearward section 35 through a pair of hydraulic swing jacks 34 (FIG. 1) having the piston end suitably pivotably connected to the rearward trough section 35 and the cylinder end suitably pivotably connected to the forward trough section 45, to thereby permit lateral swinging adjustment of the rearward section for discharging the material at opposite sides of the machine, as will be evident in the description to follow.

The forward gathering section 15, conveyor 17, and main frame 14 is pivoted about pivot means 9 on the mobile base 11 through actuation of hydraulic cylinders 8. The rear trough section 35 is pivoted relative to the forward trough section 45 about pivot means 32 through the controlled actuation of hydraulic cylinders 33.

Drive sprocket 30 (FIGS. 3 and 5) is suitably rigidly connected to a drive shaft 52 journaled for rotation in a housing 54, such that movement of the housing 54 will move the drive shaft 52 and drive sprocket 30 therewith. The respective lateral sides of housing 54 (FIG. 5) has guide brackets 55 suitably secured, welded or cast integral therewith to facilitate guiding of the housing 54 relative to the rear trough section 35 of conveyor 17. The rear trough section 35 (FIG. 5) has guide brackets 57 suitably secured thereto slidably engaged by the guide brackets 55 of housing 54 to guide the longitudinal movement of the housing 54 relative to the rear trough section 35. A transmission housing 58 is suitably secured to the respective guide brackets 55 (FIG. 5) for movement therewith, wherein the transmission housing 58 houses a worm wheel 59 rotatably secured to the end of drive shaft 52 and in addition thereto has a worm 60 suitably journaled therein for rotation to drivingly engage the worm wheel 59 such that the worm 60, worm wheel 59 and drive shaft 52 bodily move as a unit. The output end of each worm 60 has a splined connection to drive shaft 62 to provide a telescopic driving connection to a pair of laterally spaced conveyor motors 63 suitably mounted on the conveyor 17. The intermediate forward portion of housing 54 has an elongated bracket 65 (FIGS. 3 and 6) suitably connected thereto for movement therewith. The other end of bracket 65 is connected to an intermediate portion of a transversely extending pivot lever 67. Pivot lever 67 has its one end pivotally connected to a bracket 66 rigidly secured to the rear trough section 35 and the other end of pivot lever 67 is suitably pivotably connected to the rod end 69 of a hydraulic single acting takeup cylinder 70. The hydraulic takeup cylinder 70 is pivotally secured to a bracket 72 which is rigidly secured to a side portion of the rear trough section 35.

Since hydraulic cylinder 70 is a single acting jack, the pressurization of the cylinder end thereof causes a pivotal movement of pivot lever 67 about pivot means 68 in a counterclockwise direction as viewed in FIG. 3 causing the elongated bracket 65 to move leftward as viewed in FIG. 3 thereby moving housing 54 leftward. In this movement, housing 54 carries with it the driving sprocket 30 and drive shaft 52, which action maintains tension on the chain 23 and removes any slack therein.

The hydraulic circuit for the hydraulic takeup jacks 70 and the elevating jacks 33 are on the same hydraulic circuit and as shown in FIG. 7 are connected to a reservoir "R" from which fluid is drawn through a pump "P" for pressurization of conduit line 75. Conduit 75 is connected to a control valve means 76 which controls the flow of pressurized fluid to conduit 77, which conduit 77 is connected to the head ends of the elevating jacks 33 to pressurize the jacks for the extension thereof for elevating the rear trough section 35. Conduit 77 simultaneously conveys pressurized fluid via branch conduit 78 to the head end of hydraulic takeup jack 70 to extend the rod therefrom to pivot lever 67 in a counterclockwise direction to exert a tensioning on the chain 23 in a manner described above. A pressure relief valve 90 is connected to conduit 77 for conducting fluid back to the reservoir R upon excessive build up in pressure in the hydraulic cylinders or lines.

Since the loading machines operate at the face of a mine, with the rear portion of the conveyor in a raised position whereby the rear portion is resting on the fluid in the elevating jacks, pressure exists in the hydraulic circuit such that there is pressure exerted on the hydraulic takeup cylinder 70 which exerts a force on the chain 23 to take up any slack in the chain 23. When the conveyor is loaded with the material, the pressure in the hydraulic circuit is greater than when the conveyor is empty. Since the hydraulic pressure is connected to the hydraulic take-up jacks, the take-up pressure varies proportionally to the load, therefore by selecting a take-up jack with a correct piston area, the proper chain tension can be achieved. Any extension of the take-up assembly would bleed a small amount of oil from the elevating jacks 33 with a corresponding lowering of the rear conveyor trough section 35 since the quantity of hydraulic fluid in the elevating jacks 33 would be reduced. Conversely, any force moving the take-up jack 70 forward on the conveyor would force oil from the take-up jack 70 into the elevating jacks 33, raising the conveyor trough section 35, except in the case when the elevating jacks are fully extended. In this case, the excess oil is blown over the relief valve 90 which is in the elevating circuit to protect the conveyor from damage in case of roofing. As noted in FIG. 6 the lever 67 to which the take-up jack is attached has a plurality of holes in the one end thereof to provide various points at which the hydraulic take-up jack 70 can be connected to the lever 67 thereby varying the distance from the fulcrum point through which the hydraulic take-up jack reacts thereby providing different take-up pressures on the chain without altering any part of the system. Where desired adjusting means may be provided between the connection of the rod end of the hydraulic take-up cylinder with the connection to the pivotal lever 67 to provide adjustment therebetween to thereby provide a variable tensioning means.

A modification of the hydraulic take-up jack to prevent undue slack in the conveyor chain is shown in FIG. 8. The modified structure is similar to the previously described form (FIGS. 3–6) except that the lateral side portions of housing 54 are connected to a pair of laterally spaced hydraulic cylinders 80 wherein the cylinder ends are suitably pivotally connected to brackets 82 rigidly secured to the rear conveyor 17. In this modification the piston areas of pistons 80 may be varied to provide pistons of different areas thereby the take-up pressure can be varied giving an effective takeup means for the slack in the chain 23.

A further modification is shown in FIG. 9 wherein the structure is similar to the modification of FIG. 8 except that a single acting hydraulic take-up jack 85 has one end connected to the housing 54 and the other end pivotally connected to a transversely extending bracket 86 that is suitably rigidly connected to the conveyor 17.

While there has been disclosed and described above several specific embodiments of the invention, it will be appreciated that the invention may be practiced with other modifications without departing from the spirit or scope of the invention as set forth in the appended claims.

I claim:

1. In a conveyor apparatus, a pair of elongated conveyor frame sections disposable in longitudinal alignment, one of said sections having a free end, said one section swingable about a horizontal transverse axis relative to the other frame section to vary the vertical location of said free end, an orbital flexible conveyor extending between relatively remote ends of said conveyor frame sections and guided for circulation relative thereto, driving means for the flexible conveyor mounted on a support slidable relative to said one section, a hydraulic tensioning means having one end connected to said one section and the other end to said slidable support, an isolated pressurable fluid system, a hydraulic elevating means for elevating and lowering the free end of said section and being responsive to a load on the flexible conveyor to cause pressure within said system, said hydraulic tensioning means and said hydraulic elevating means being operatively connected to each other in said system so that said hydraulic tensioning means is responsive to the load on the conveyor to maintain tension on the flexible conveyor.

2. The combination of claim 1 wherein the hydraulic tensioning means includes adjusting means for adjusting the tension on said flexible conveyor.

3. The combination of claim 2 wherein the hydraulic tensioning means comprises a single acting hydraulic cylinder supported by said one section with the piston rod thereof connected to one end of a lever, the other end of said lever being pivotally connected to said one section and the intermediate portion of said lever being connected to the slidable support whereby actuation of said piston rod pivots said lever to bodily move the slidable support thereby effecting a take-up in slack on said flexible conveyor.

4. The combination of claim 3 wherein said one end of the lever has a plurality of apertures to selectively locate the end of said piston rod to vary the take-up pressures on said flexible conveyor.

References Cited in the file of this patent

UNITED STATES PATENTS

| | | |
|---|---|---|
| 2,665,794 | Slomer | Jan. 12, 1954 |
| 2,766,871 | Arentzen | Oct. 16, 1956 |